United States Patent
Fradin

[11] Patent Number: 6,071,638
[45] Date of Patent: Jun. 6, 2000

[54] CYLINDRICAL CELL HAVING CURRENT OUTPUT TERMINAL CONNECTED TO ELECTRODE BY CONDUCTIVE BLADE MEMBERS

[75] Inventor: Jean Fradin, Fontaine Le Comte, France

[73] Assignee: SAFT, Romainville, France

[21] Appl. No.: 08/902,194

[22] Filed: Jul. 29, 1997

[30] Foreign Application Priority Data

Jul. 30, 1996 [FR] France ................................. 96 09569

[51] Int. Cl.[7] ....................................... H01M 2/20
[52] U.S. Cl. ........................... 429/94; 429/178; 429/211; 429/182
[58] Field of Search ............................. 429/94, 164, 166, 429/168, 169, 170, 178, 231.1, 231.2, 231.3, 231.4, 211, 182, 231.95

[56] References Cited

U.S. PATENT DOCUMENTS

| | | | |
|---|---|---|---|
| 3,257,238 | 6/1966 | Andre | 136/14 |
| 3,490,949 | 1/1970 | Deschamps | 136/13 |
| 3,565,690 | 2/1971 | Jouchad Du Plessix et al. | 136/14 |
| 3,775,182 | 11/1973 | Patton et al. | 136/13 |
| 4,053,687 | 10/1977 | Coibion et al. | 429/94 |
| 4,322,484 | 3/1982 | Sugalski | 429/94 |
| 5,707,758 | 1/1998 | Iwatsu et al. | 429/94 |
| 5,849,431 | 12/1998 | Kita et al. | |

FOREIGN PATENT DOCUMENTS

| | | |
|---|---|---|
| 0357399A2 | 3/1990 | European Pat. Off. . |
| 0620610A1 | 10/1994 | European Pat. Off. . |
| 1484611 | 6/1967 | France . |

OTHER PUBLICATIONS

Patent Abstracts of Japan, vol. 012, No. 020 (E–575) dated Jan. 21, 1988 corresponding to JP 62 177869 A (Shin Kobe Electric Mach Co Ltd) dated Aug. 4, 1987.

Patent Abstracts of Japan, vol. 008, No. 268 (E–283), Dec. 7, 1984 corresponding to JP 59 139555 A (Toshiba Denchi KK) dated Aug. 10, 1984.

*Primary Examiner*—Maria Nuzzolillo
*Assistant Examiner*—Jennifer O'Malley
*Attorney, Agent, or Firm*—Sughrue, Mion, Zinn, Macpeak & Seas, PLLC

[57] ABSTRACT

A cell with spiral-wound electrodes comprises a container, two current output terminals of opposite polarity carried by the container, each current output comprising a part exterior to the container and an internal part, and two electrodes spiral-wound about a longitudinal axis, one of positive polarity and the other of negative polarity, electrically connected to a corresponding current output. At least one terminal has a cylindrical shoulder having a diameter greater than the transverse dimension of the exterior part of the terminal. The electrode is provided with a plurality of conductive blade members in part substantially parallel to the longitudinal axis, mechanically and electrically connected to one edge of the electrode are projecting from this edge. The blade members are grouped together on and fixed to at least part of the periphery of the shoulder in order to establish electrical contact between the electrode and the current output.

31 Claims, 4 Drawing Sheets

CYLINDRICAL CELL HAVING CURRENT OUTPUT TERMINAL CONNECTED TO ELECTRODE BY CONDUCTIVE BLADE MEMBERS

BACKGROUND OF THE INVENTION

1. Field of the Invention

The present invention concerns a rechargeable cell with spiral-wound electrodes, especially a lithium cell.

2. Description of the Prior Art

In a spiral-wound electrode cell the electrodes are in the form of strips spiral-wound around a central mandrel to form a cylinder. Each electrode comprises a metal current collector which supports the active material of the electrode on at least one of its faces. It is electrically connected to a current output terminal which provides electrical continuity between the electrode and the external application with which the cell is associated.

The terminal passes through the container of the cell: the part outside the container receives the external connections and the part inside it is connected to the electrodes. The terminal can be part of or attached to the container. When it is attached to the container, an electrically insulative seal is usually provided between said terminal and the container of the cell.

There are various ways to make the electrical connection between an electrode and a current output.

One way is to use a conductive blade member or thin metal strip: one end is welded to the edge of the collector, the other end being welded to the internal part of the terminal situated inside the container. For reasons of overall size, the blade member is generally fixed to the part of the collector nearest the axis of the spiral. A single blade member is sufficient for an electrode of low capacity, for example less than 5 ampere-hours, and a low power, for example less than 40 watts.

An aim of the invention is to propose a cell with spiral-wound electrodes, a high capacity and/or a high power.

An aim of the invention is to propose a lithium cell with spiral-wound electrodes, a high capacity and/or a high power.

By high capacity is meant a capacity greater than 20 ampere-hours. By high power is meant a power greater than 60 watts.

SUMMARY OF THE INVENTION

The invention consists in a rechargeable cell with spiral-wound electrodes comprising a container, two current output terminals of opposite polarity carried by said container, each current output comprising a part exterior to said container and an internal part, and two electrodes spiral-wound about a longitudinal axis, one of positive polarity and the other of negative polarity, and electrically connected to a corresponding current output, wherein at least one current output terminal comprises an internal part provided with a cylindrical shoulder having a diameter greater than the transverse dimension of said exterior part and the corresponding electrode is provided with a plurality of conductive blade members in part substantially parallel to said longitudinal axis, mechanically and electrically connected to one edge of said electrode and projecting from said edge, said blade members being grouped together on and fixed to at least part of the periphery of said shoulder in order to establish electrical contact between said electrode and said current output terminal.

By periphery is meant the surface separating the two sections which delimit the shoulder on the internal part of the terminal.

After spiral winding of the electrode provided with the blade members, the position of the blade members on the section of the cylinder formed by the electrode is irregular. In accordance with the invention, the electrical connection is made regardless of the position and the number of blade members.

To be able to use blade members of fixed length regardless of their position relative to the axis of the spiral of the electrode, the shoulder to which the blade members are fixed preferably has a width between 40% and 60% of the distance between the exterior radius and the interior radius of the cylinder formed by the spiral-wound electrode. This width is advantageously substantially equal to half the distance between the exterior radius and the interior radius of the cylinder formed by the spiral-wound electrode.

To limit the overall size of this internal part, it is preferably a cylinder of low height, for example a height between 2 mm and 5 mm.

This internal part is electrically connected to the corresponding electrode by the conductive blade members. Said electrode is long, i.e. before spiral winding it is of great length compared to its width. The electrode is spiral-wound in the lengthwise direction. The blade members are first grouped around said periphery by any appropriate means, preferably pressing means in order to enhance the electrical contact between said blade members and the terminal: regardless of their number, they can form a single conductor assembly electrically connected to the terminal. They are then fixed to the latter by any means capable of providing a durable fixing and which conducts the current between the blade members and the terminal. These can be mechanical means such as a ring or a wire associated with a groove on the periphery of said shoulder. The fixing is preferably by welding, for example electrical welding or ultrasonic welding.

These blade members can be held in place on said periphery before they are fixed, for example welded, by appropriate means such as the mechanical means previously referred to. These means can be removed or left in place on the terminal.

In one variant of the invention the current output is a current output terminal the internal part of which comprises two areas: a lower area comprising the shoulder to at least part of the periphery of which the blade members are fixed and an upper area comprising at least one flat adapted to cooperate with an abutment fixed to the internal face of the container of the cell through the intermediary of at least one flat on a seal disposed between said upper area and said abutment.

The height of the internal part is then between 3 mm and 10 mm, for example.

In another variant of the invention, the current output is a current output terminal carried by the cover of the cell. The terminal is fixed to said cover in this variant by crushing a seal between said terminal and said cover. This crushing is produced by clamping, for example. The clamping may be produced by a clamping nut or by the bearing engagement of a fixing part, for example.

The electrode of the invention has a length exceeding 2 meters, even 5 meters. It is between 3 meters and 7 meters, for example. The number of blade members connected to this electrode depends on the capacity of the electrode, its length and the power required. The distance between two blade members on the electrode is between 60 mm and 300 mm, for example. They are preferably disposed at regular intervals. The number of these blade members is greater than three and can even be greater than 10 or even 30. Their number is between 15 and 40, for example.

The electrode of the invention comprises a spiral-wound strip supporting the active material of the electrode on at least part of at least one of its faces. The current collector is a thin metal film, having a thickness less than 50 microns, for example. The edge of the current collector can be reinforced. The reinforcement is an additional thickness integral with or attached to said edge, for example. It can be an increase in the thickness of the edge or an attached separate part, for example. This part can have dimensions virtually identical to the dimensions of the edge to be reinforced, for example. It is fixed, for example welded, to said edge. It can equally well be U-shaped, the branches of the U straddling the faces of the edge. It can then be fixed to the edge by crimping, welding or any other means.

Each blade member is fixed to one edge of the electrode by any means to assure the electrode/blade member connection and to conduct the current. They are fixed by welding, for example. The blade member can be a thin metal strip one end of which is fixed to the edge of the collector, the other end being connected to the current output. The two ends of the thin metal strip can equally well be fixed to said edge, the blade member forming a loop the end of which is electrically connected to the current output. The blade member is therefore entirely parallel to the longitudinal axis before spiral winding and fixing to the shoulder of the internal part. After spiral winding and fixing to said shoulder, the blade member therefore comprises an emergent part, possibly reinforced, substantially parallel to the longitudinal axis, and a part that converges towards said shoulder.

The cell of the invention is advantageously a lithium cell. Its capacity is greater than 20 ampere-hours, for example, and/or its power is greater than 60 watts, for example.

The invention also consists in a lithium cell comprising a container having a bottom and a cover each carrying a current output terminal, a positive electrode and a negative electrode spiral-wound about a longitudinal axis, respectively connected to the respective current output, and a set of connections for electrically connecting each electrode to the corresponding current output terminal, wherein said terminal comprises an exterior part and an internal part, said internal part of said terminal having a cylindrical shoulder having a diameter greater than the transverse dimension of said exterior part of said terminal and, for each electrode, said set of connections is a set of conductive blade members in part substantially parallel to said longitudinal axis, mechanically and electrically connected to one edge of said electrode and projecting from said edge, said blade members being grouped together on and fixed to at least part of the periphery of said shoulder in order to establish electrical contact between said electrode and the corresponding current output terminal. In accordance with the invention, the terminal comprises an exterior part and an internal part, the internal part comprising a cylindrical shoulder the diameter of which is greater than the transverse dimension of the exterior part of the terminal in the upper part of the terminal. In accordance with the invention, the set of connections for each electrode is a set of conductive blade members in part substantially parallel to said longitudinal axis, mechanically and electrically connected to one edge of the electrode and projecting from said edge. The blade members are grouped on and fixed to at least part of the periphery of said shoulder in order to establish electrical contact between the shoulder and the current output. The cell of the invention has a capacity greater than 20 ampere-hours and/or a power greater than 60 watts.

The positive electrode is electrically connected to a current output terminal at the same potential as the container of the cell, for example. The container is of aluminum, for example.

Each electrode comprises a spiral-wound strip supporting the active material of the electrode on at least part of at least one of its faces.

The active material of the positive electrode then comprises a substance capable of inserting lithium. It is selected from a transition metal oxide, a sulfide, a sulfate and mixtures thereof. For example, it is a substance chosen from lithium-containing metal sulfides, lithium-containing metal selenides, lithium-containing metal oxides, lithium-containing oxides of transition metals and mixtures thereof. For example, derivatives of molybdenum, titanium, chromium, nickel, vanadium, manganese, cobalt, copper, iron, tungsten, niobium, ruthenium or iridium can be used. For example, they are lithium-containing metal oxides chosen from cobalt, nickel, manganese, vanadium, iron, titanium oxides and mixtures thereof. The material of the collector is any material compatible with the active material of the electrode and the electrolyte used. It is chosen from aluminum and stainless steel, for example. Its thickness is less than 50 microns, for example. It is between 10 microns and 20 microns, for example.

The active material of a negative electrode usable in a lithium cell comprises lithium or a substance capable of inserting lithium, for example a carbon-based material chosen from graphite, coke and vitreous carbon. The material of its collector is compatible with the active material of the electrode and the electrolyte used. It is chosen from copper and nickel. Its thickness is less than 50 microns, for example. It is between 10 microns and 20 microns, for example.

The material of the blade members of the invention is preferably of the same kind as that of the collector to which they are fixed. They have a thickness between 50 microns and 200 microns, preferably in the order of 100 microns.

Other features and advantages of the invention will emerge from the following description given by way of non-limiting example with reference to the accompanying drawings.

DETAILED DESCRIPTION OF THE PREFERRED EMBODIMENTS

Figure 1:
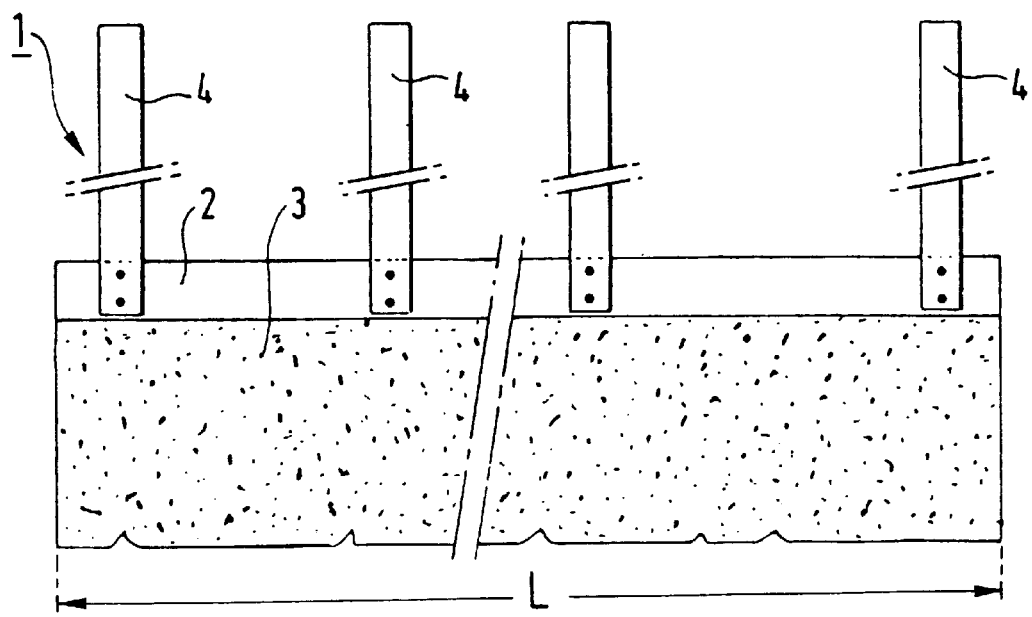
FIG. 1 is a diagrammatic view of an electrode in accordance with the invention adapted to be spiral-wound.

FIG. 1 shows an electrode 1 adapted to be spiral-wound. It includes a collector 2 in the form of a strip supporting the active material 3 of the electrode on at least one of its faces. The collector 2 is of a conductive material stable in relation to the active material of the electrode and in relation to the electrolyte used. It has been bared along its longer edge, i.e. along the length L of the electrode, so that a plurality of conductive blade members 4 can be fixed to this edge 2. The blade members 4 are substantially perpendicular to said edge and are electrically connected to it. This edge can be reinforced by increasing its thickness or by an attached part. The material of the blade members 4 is preferably of the same kind as that of the collector to which they are fixed. The thickness of these blade members is less than 200 microns. Each is a simple metal strip or a metal strip one end of which is fixed to the collector 2 forming a loop the two ends of which are fixed to the edge of the collector 2 at the same point. They are fixed by welding, for example. This electrode can be used for a lithium cell of high capacity and/or of high power, for example.

Figure 2:
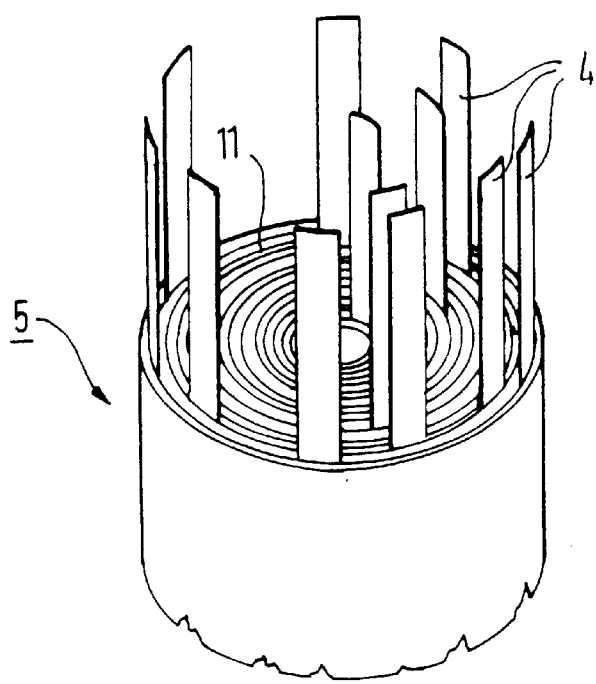
FIG. 2 is a fragmentary diagrammatic perspective view of a set of spiral-wound electrodes in accordance with the invention.

FIG. 2 is a perspective view of a set 5 of spiral-wound electrodes forming a cylinder. This set is constituted of two electrodes of opposite polarity and two separators, not shown. The current collector of each of the electrodes supports the active material of the electrode on each of its faces. The two separators are interleaved between each electrode. Each electrode is connected to a corresponding current output. The negative electrode 11 is connected to a current output, not shown, by means of the blade members 4, for example. This figure shows clearly the irregular positioning of the blade members 4 on the section of the cylinder formed by the set 5 of electrodes.

Figure 3:
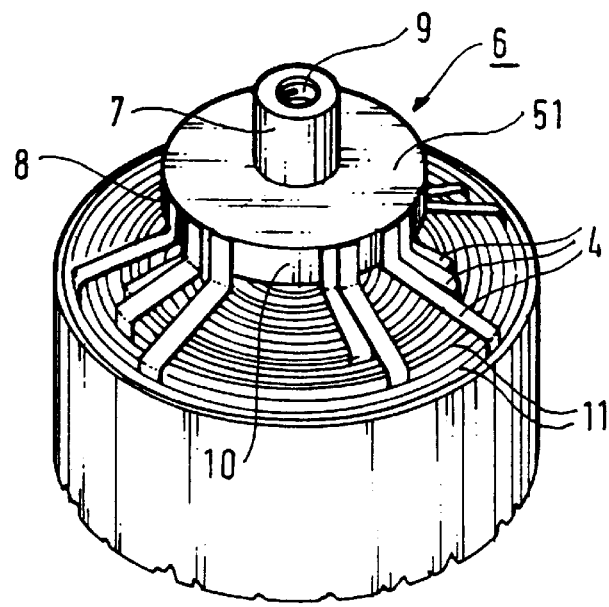
FIG. 3 is a diagrammatic perspective view of the electrical connection of an electrode in accordance with the invention to a corresponding current output terminal.

FIG. 3 shows the connection in accordance with the invention of the blade members 4 to a current output terminal 6. This terminal comprises a part 7 exterior to container of the cell, not shown, and a part 8 situated in the interior of the container. The exterior part 7 receives the connection from the external application with which the cell is associated by means of a screwthread 9, for example. The internal part 8 has a cylindrical shoulder 51 the diameter of which is larger than that of the upper part 7 of the terminal. Here this shoulder is shown as a low cylinder on the periphery 10 of which the blade members 4 have been grouped and to which they have been fixed. To make the figure easier to understand, only a few blade members 4 have been shown, fixed to a part of the periphery 10 of the shoulder 51. The blade members 4 can be grouped on said periphery 10 by pressing means, for example, such as a cylindrical part moved concentrically towards the periphery 10 of the shoulder 51. This pressing additionally enhances the electrical contact between the blade members 4 and the terminal 6 in that the blade members are pressed together and against the terminal 6. The blade members 4 are then fixed by fixing means chosen to assure a durable fixing and electrical conduction between these blade members and the terminal. They are preferably fixed by welding.

Figure 4:
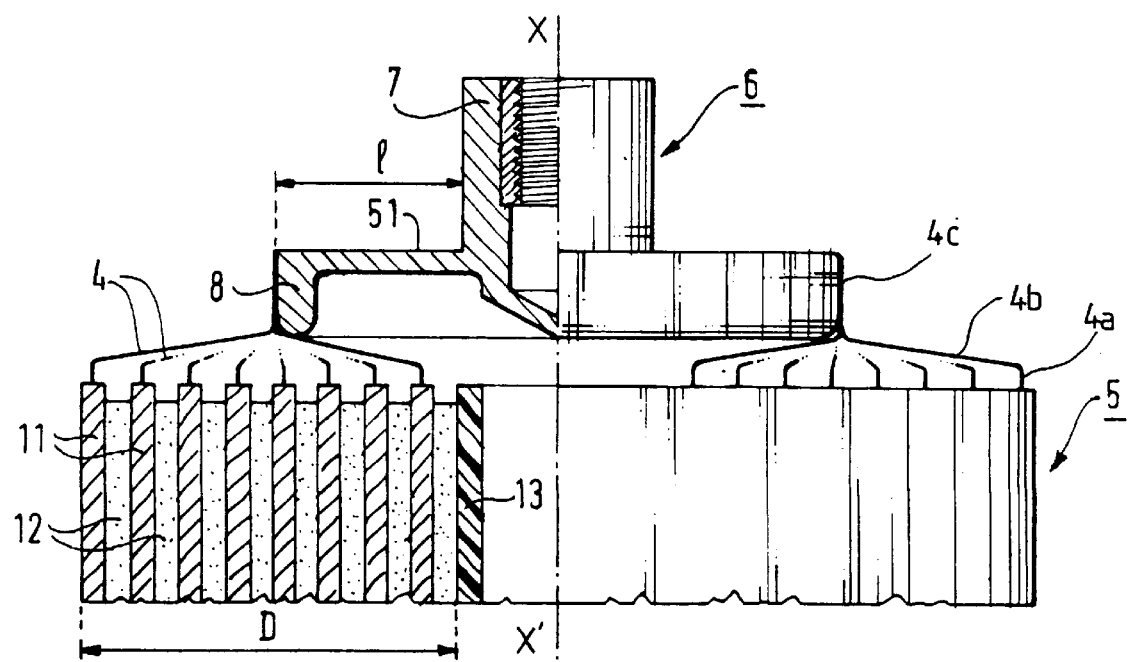
FIG. 4 is a diagrammatic longitudinal half-section of the terminal from FIG. 3.

FIG. 4 is a diagrammatic longitudinal half-section of the terminal from FIG. 3. The set 5 of electrodes comprises a negative electrode 11 and a positive electrode 12 separated by a separator, not shown. They are spiral-wound around a central mandrel 13 of insulative material with a longitudinal axis X'X. In this figure, the width 1 of the shoulder 51 is substantially equal to half the distance d between the external and internal radii of the cylinder formed by the set 5 of electrodes 11 and 12. This figure shows the emergent part 4a of a blade member 4, which is substantially parallel to the longitudinal axis, the convergent part 4b of said blade member 4 and another part 4c of said blade member 4.

Figure 5:
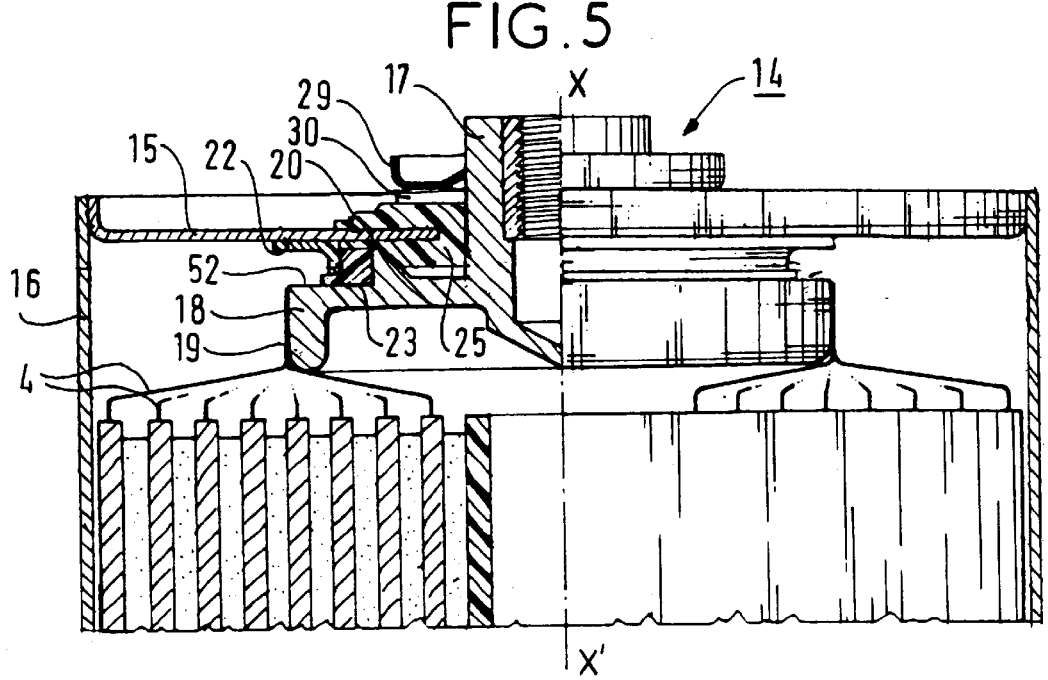
FIG. 5 is a diagrammatic longitudinal half-section of the electrical connection of a second embodiment of electrode of the invention to a terminal.
Figure 6:
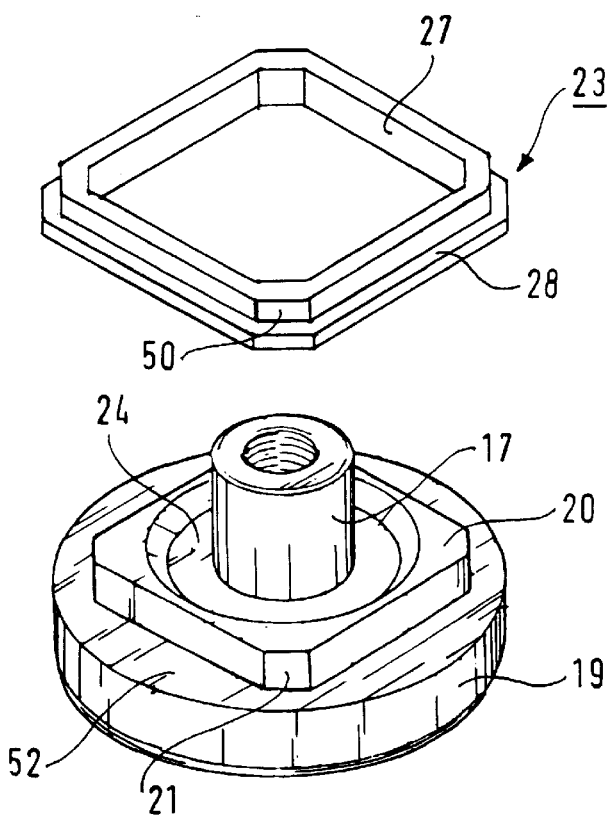
FIG. 6 is a diagrammatic perspective view of the terminal from FIG. 5 electrically connected to an electrode.

FIGS. 5 and 6 show one variant of a terminal 14 in accordance with the invention. This terminal is carried by the container of the cell. This container comprises a metal cover 15 and a tank 16. The container is substantially a cylinder with a longitudinal axis X'X. The cover 15 is welded to the tank 16, for example, and carries the terminal 14. This terminal 14 comprises an exterior part 17, identical to that shown in FIG. 3, for example, and an internal part 18. In this variant, this internal part comprises a lower area 19 provided with a shoulder 52 to the periphery of which the blade members 4 are fixed and an upper area 20 comprising at least one flat 21 shown in FIG. 6 cooperating with an abutment 22 via a seal 23 to prevent any rotation movement of the terminal 14 when it is subjected to a clamping movement, as described below. The flat 21 is obtained by chamfering the corners of the upper area 20, for example. This upper area 20 comprises a conical opening 24 at the center shown in FIG. 6 to receive a seal 25 shown in FIG. 5 providing a seal and electrical insulation between the terminal 14 and the cover 15 of the cell. The rotation preventing seal 23 has an interior section 27 identical to the exterior section of the upper area 20. Consequently, it has at least one flat 50. This rotation preventing seal 23 also has a ring 28 to cooperate with an abutment 22 shown in FIG. 5 and fixed to the cover 15. Rotation of the terminal due to clamping movement is prevented by this flat, the seal 23 including at least one flat 50 and the abutment 22. This movement may be caused by fixing the exterior connection from the application with which the cell is associated and/or by fixing the terminal 14 to the cover 15.

The terminal 14 is fixed to the cover 15 of the cell by crushing the seal 25 with a clamping action, here by the bearing engagement of a fixing part 29. This is a ring inside which the terminal 14 is inserted. The interior diameter of the part 29 is slightly less than the diameter of the exterior part 17 of the terminal 14, for example, in order for said terminal to be retained in said part. The pressure exerted by the part 29 and the metal clamping washer 30 crushes the seal 25 between the washer 30, the cover 15 and the terminal 14, in particular the shoulder 52 of the lower area 19 of the internal part 18.

Figure 7:
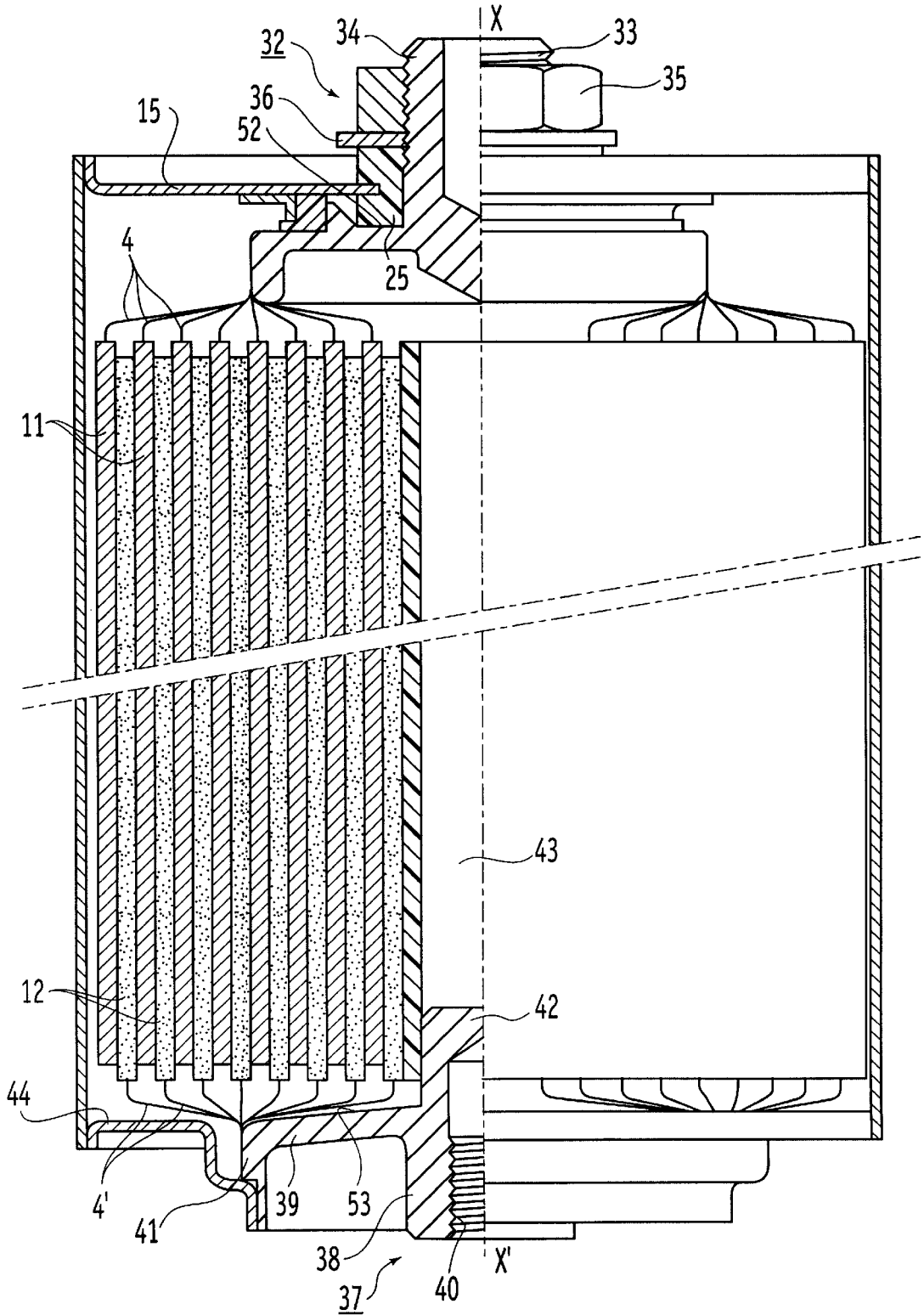
FIG. 7 is a diagrammatic longitudinal half-section of two electrodes of opposite polarity electrically connected to corresponding current output terminals.

FIG. 7 shows the electrical connection in accordance with the invention of two electrodes 11 and 12 to current output terminals 32 and 37. The axis X'X of the substantially cylindrical container is shown. The negative electrode 11 is connected to a current output terminal 32 by the blade members 4 and the other positive electrode 12 is connected to the current output terminal 37. The terminal 32 is globally identical to the terminal 14 from FIG. 5 or FIG. 6 except that it has an external screwthread 33 on the exterior part 34 of the terminal. This screwthread receives a metal nut 35 and a metal clamping washer 36. The clamping pressure crushes the seal 25 between the clamping washer 36, the cover 15 and the terminal 32, in particular the shoulder 52.

The electrode 12 is connected in accordance with the invention to a current output terminal 37 by the blade members 4'. Here the terminal is at the same positive potential as the blade members 4' and the electrode 12, because there is no electrically insulative seal. The terminal 37 comprises a part 38 exterior to the container of the cell and a part 39 internal to the container. The external part is electrically connected to the exterior application with which the cell is associated by means of a screwthread 40, for example. The internal part 39 is provided with a shoulder 53. It is connected to the electrode 12 by the blade members 4' grouped together on and fixed to at least part of the periphery 41 of the shoulder 53. It further comprises a preeminence 42 that can be inserted into the cavity 43 of the hollow mandrel 13 around which the electrodes 11 and 12 have been spiral-wound. This preeminence 42 centers the terminal relative to the set 5 of electrodes when it is fitted. This figure shows that the terminal is part of the bottom of the container, a portion of which has been machined to this shape. The bottom of the container comprises the terminal 37 and an auxiliary part 44. This part is separate from the container of the cell, for example, to enable free access to the periphery 41 of the shoulder 53 for fixing the blade members 4' to it. It is then attached and fixed to the tank 16 and to the terminal 37, for example by welding.

In another variant, not shown, the terminal 32 is fixed to the cover 15 and the connection to the exterior application with which the cell is associated is made by a single clamping system, for example as described in document U.S. Pat. No. 3,762,958.

The various embodiments and variants of the invention are given by way of non-limiting example only, any other variant or embodiment being usable without departing from the spirit of the invention, and in particular any means as described can be replaced by equivalent means.

There is claimed:

1. A rechargeable cell with spiral-wound electrodes comprising a container, two current output terminals of opposite polarity carried by said container, each current output comprising a part exterior to said container and an internal part, and two electrodes spiral-wound about a longitudinal axis, one of positive polarity and the other of negative polarity, and electrically connected to a corresponding current output, wherein at least one current output terminal comprises an internal part provided with a cylindrical shoulder having a diameter greater than the transverse dimension of said exterior part and the corresponding electrode is provided with a plurality of conductive blade members in part substantially parallel to said longitudinal axis, mechanically and electrically connected to one edge of said electrode and projecting from said edge, said blade members being grouped together on and fixed to at least part of an outer radially facing surface of said shoulder in order to establish electrical contact between said electrode and said current output terminal.

2. The cell claimed in claim 1 wherein said shoulder has a width between 40% and 60% of the distance between the exterior radius and the interior radius of the cylinder formed by the spiral-wound electrodes.

3. The cell claimed in claim 2 wherein said width is substantially equal to half the distance between said exterior radius and said interior radius of said cylinder formed by said electrodes.

4. The cell claimed in claim 1 wherein said cylindrical shoulder has a height between 2 mm and 5 mm.

5. The cell claimed in claim 1 wherein said blade members are welded to said periphery.

6. The cell claimed in claim 5 wherein said blade members are held onto said periphery by means selected from the group consisting of a ring and a wire associated with a groove on said periphery.

7. The cell claimed in claim 1 wherein said internal part of said terminal comprises a lower area comprising a shoulder to at least part of the periphery of which said blade members are fixed and an upper area comprising at least one flat cooperating with an abutment fixed to said internal face of said container of said cell through the intermediary of at least one flat on a seal between said upper area and said abutment.

8. The cell claimed in claim 7 wherein the height of said internal part is between 3 mm and 10 mm.

9. The cell claimed in claim 1 wherein said container of said cell comprises a cover through which said terminal passes, said terminal being fixed to said cover by crushing a seal between said terminal and said cover.

10. The cell claimed in claim 9 wherein said crushing is obtained by clamping a nut.

11. The cell claimed in claim 1 wherein the length of said electrode is greater than 2 meters.

12. The cell claimed in claim 1 wherein the number of conductive blade members is greater than 3.

13. The cell claimed in claim 1 wherein said electrode comprises a current collector in the form of a spiral-wound strip supporting said active material of said electrode on at least part of at least one face, the thickness of said current collector being less than 50 microns.

14. The cell claimed in claim 1 wherein said electrode comprises a current collector in the form of a spiral-wound strip supporting said active material of said electrode on at least part of at least one face, the edge of said collector being reinforced by increasing the thickness of said edge.

15. The cell claimed in claim 1 wherein said blade member is a thin metal strip both ends of which are fixed to said collector, said blade member forming a loop.

16. The cell claimed in claim 1 consisting of a lithium cell.

17. A lithium cell comprising a container having a bottom and a cover each carrying a current output terminal, a positive electrode and a negative electrode spiral-wound about a longitudinal axis, respectively connected to the respective current output, and a set of connections for electrically connecting each electrode to the corresponding current output terminal, wherein said terminal comprises an exterior part and an internal part, said internal part of said terminal having a cylindrical shoulder having a diameter greater than the transverse dimension of said exterior part of said terminal and, for each electrode, said set of connections is a set of conductive blade members in part substantially parallel to said longitudinal axis, mechanically and electrically connected to one edge of said electrode and projecting from said edge, said blade members being grouped together on and fixed to at least part of an outer radially facing surface of said shoulder in order to establish electrical contact between said electrode and the corresponding current output terminal.

18. The cell claimed in claim 17 wherein said positive electrode is electrically connected to a current output terminal at the same potential as said container of said cell.

19. The cell claimed in claim 17 wherein said container is of aluminum.

20. The cell claimed in claim 17 wherein said electrode comprises a spiral-wound strip supporting said active material of said electrode on at least part of at least one face, said active material of said positive electrode comprising a lithium-containing metal oxide.

21. The cell claimed in claim 20 wherein said lithium-containing metal oxide is selected from a group consisting of cobalt, nickel, manganese, vanadium, iron and titanium oxides and mixtures thereof.

22. The cell claimed in claim 20 wherein the material of a current collector of said positive electrode is selected from a group consisting of aluminum and stainless steel.

23. The cell claimed in claim 20 wherein the thickness of a current collector of said positive electrode is less than 50 microns.

24. The cell claimed in claim 20 wherein the material of said blade members connected to said positive electrode is selected from a group consisting of aluminum and stainless steel and its thickness is between 50 microns and 200 microns.

25. The cell claimed in claim 17 wherein said electrode comprises a spiral-wound strip supporting said active material of said electrode on at least part of at least one face, said active material of said negative electrode containing lithium.

26. The cell claimed in claim 17 wherein said electrode comprises a current collector in the form of a spiral-wound strip supporting said active material of said electrode on at least part of at least one face, said active material of said negative electrode comprising a lithium insertion substance.

27. The cell claimed in claim 26 wherein said active material of said negative electrode is a carbon-based material selected from a group consisting of graphite, coke and vitreous carbon.

28. The cell claimed in claim 26 wherein said material of said collector of said negative electrode is selected from a group consisting of copper and nickel.

29. The cell claimed in claim 26 wherein the thickness of said collector is less than 50 microns.

30. The cell claimed in claim 26 wherein the material of said blade members connected to said negative electrode is selected from a group consisting of copper and nickel and its thickness is between 50 microns and 200 microns.

31. The cell claimed in claim 1 having a capacity greater than 20 ampere-hours and/or a power greater than 60 watts.

* * * * *